US012735576B2

(12) United States Patent
Bedford et al.

(10) Patent No.: US 12,735,576 B2
(45) Date of Patent: Sep. 15, 2026

(54) PLATE-LIKE PVD ALUMINUM PIGMENT WITH A PROTECTIVE ENCAPSULATION AND METHOD FOR MANUFACTURING A PLATE-LIKE PVD ALUMINIUM PIGMENT WITH A PROTECTIVE ENCAPSULATION

(71) Applicant: ECKART GmbH, Hartenstein (DE)

(72) Inventors: Oliver Bedford, Hartenstein (DE); Frank Hippmann, Hartenstein (DE); Johannes Zitzmann, Hartenstein (DE); Robert Maul, Hartenstein (DE)

(73) Assignee: Eckart GmbH, Hartenstein (DE)

(*) Notice: Subject to any disclaimer, the term of this patent is extended or adjusted under 35 U.S.C. 154(b) by 229 days.

(21) Appl. No.: 16/768,473

(22) PCT Filed: Dec. 3, 2018

(86) PCT No.: PCT/EP2018/083317

§ 371 (c)(1),
(2) Date: May 29, 2020

(87) PCT Pub. No.: WO2019/110490

PCT Pub. Date: Jun. 13, 2019

(65) Prior Publication Data

US 2021/0171776 A1 Jun. 10, 2021

(30) Foreign Application Priority Data

Dec. 6, 2017 (EP) .................................... 17205685

(51) Int. Cl.
*C09C 1/00* (2006.01)

(52) U.S. Cl.
CPC .......... *C09C 1/0051* (2013.01); *C09C 1/0024* (2013.01); *C01P 2004/24* (2013.01); *C01P 2004/61* (2013.01); *C09C 2200/1058* (2013.01); *C09C 2200/301* (2013.01); *C09C 2200/303* (2013.01); *C09C 2220/106* (2013.01)

(58) Field of Classification Search
CPC .... C09C 1/0024; C09C 1/0051; C09D 11/037
See application file for complete search history.

(56) References Cited

U.S. PATENT DOCUMENTS 5,624,076 A 4/1997 Miekka et al.
5,624,486 A * 4/1997 Schmid .................... C09D 5/36 427/217
7,806,976 B2 10/2010 Nakao
8,071,170 B2 12/2011 Kamimori et al.
8,900,658 B2 12/2014 Nguyen et al.
8,903,611 B2 12/2014 Uchida et al.
9,000,068 B2 4/2015 Trummer et al.
9,376,577 B2 6/2016 Shizmu et al.
9,624,378 B2 4/2017 Hippmann et al.
9,732,237 B2 8/2017 Sugamoto et al.
9,777,160 B2 10/2017 Struck et al.
10,557,037 B2 2/2020 Kreppner et al.
2006/0150864 A1* 7/2006 Hashizume .......... C09D 11/037 106/400
2007/0199478 A1 8/2007 Schlegl et al.
2008/0087187 A1* 4/2008 Maul ...................... C09C 1/646 524/80
2008/0249209 A1 10/2008 Trummer
2010/0047199 A1 2/2010 Trummer
2010/0196296 A1 8/2010 Geissler et al.
2011/0008613 A1 1/2011 Takano et al.
2011/0207833 A1* 8/2011 Albrecht .................. C09D 5/36 524/406
2011/0293547 A1 12/2011 Geissler et al.
2012/0208035 A1 8/2012 Iwamoto et al.
2013/0102717 A1 4/2013 Akutagawa et al.
2013/0131187 A1 5/2013 Hashizume et al.
2013/0209790 A1 8/2013 Geissler
2015/0071973 A1 3/2015 Fujii et al.
2015/0166760 A1* 6/2015 Trummer ............. C09C 1/0021 524/440
2017/0306159 A1 10/2017 Lang et al.
2017/0348201 A1 12/2017 Grüner et al.
2018/0155550 A1 6/2018 Grüner et al.
2018/0344586 A1* 12/2018 Rohrer ................. A61K 8/0245
2020/0131374 A1 4/2020 Hayashi et al.

FOREIGN PATENT DOCUMENTS

CN 1694929 A 11/2005
CN 101238183 A 8/2008
CN 102365335 A 2/2012
DE 4319669 A1 * 1/1994 .............. A61K 8/11
DE 102010007147 A1 8/2011
DE 102011103882 A1 9/2012
DE 102013113885 A1 6/2015
EP 1619222 A1 1/2006
EP 1953195 A1 8/2008
EP 1812519 B1 9/2008

(Continued)

OTHER PUBLICATIONS

Machine translation WO-2016120015-A1 (Year: 2016).*
Machine translation WO 2009/119143. (Year: 2023).*
Machine translation DE4319669. (Year: 2023).*
Machine translation WO-2016120015-A1 (Year: 2023).*
International Search Report and Written Opinion for International Application No. PCT/EP2018/083317 dated Jan. 28, 2019.

(Continued)

*Primary Examiner* — Alexandre F Ferre
(74) *Attorney, Agent, or Firm* — Fitch, Even, Tabin & Flannery LLP

(57) ABSTRACT

The invention is directed to a plate-like PVD aluminum pigment with a protective encapsulation, wherein said protective encapsulation comprises a) a continuous encapsulating silicon oxide containing coating (a), wherein said silicon oxide containing coating comprises at least 60 wt.-% silicon oxide, based on the total weight of said silicon oxide containing coating, and b) a layer (b) of metal oxide, wherein said metal oxide is selected from the group consisting of molybdenum oxide, molybdenum hydroxide, molybdenum oxide hydrate, tungsten oxide, tungsten hydroxide, tungsten oxide hydrate and mixtures thereof, and c) optionally an outer organic-chemical modification layer. The invention is further directed to method for producing the plate-like metal pigment as well as the use thereof.

14 Claims, No Drawings

(56) References Cited

FOREIGN PATENT DOCUMENTS

| | | | | | |
|---|---|---|---|---|---|
| JP | S58109562 | A | | 6/1983 | |
| JP | H8209025 | A | | 8/1996 | |
| JP | 2003147226 | A | | 5/2003 | |
| JP | 2004096921 | A | | 3/2004 | |
| JP | 2008511704 | A | | 4/2008 | |
| JP | 2012021040 | A | | 2/2012 | |
| JP | 2013185028 | A | | 9/2013 | |
| JP | 2017508016 | A | | 3/2017 | |
| KR | 100696923 | | | 3/2007 | |
| WO | 2004087816 | A1 | | 10/2004 | |
| WO | WO-2009119143 | A1 | * | 10/2009 | ............. C09C 1/648 |
| WO | 2015013762 | A1 | | 2/2015 | |
| WO | 2016059033 | A1 | | 4/2016 | |
| WO | WO-2016120015 | A1 | * | 8/2016 | ........... A61K 8/0254 |
| WO | 2018180936 | A1 | | 10/2018 | |

* cited by examiner

PLATE-LIKE PVD ALUMINUM PIGMENT WITH A PROTECTIVE ENCAPSULATION AND METHOD FOR MANUFACTURING A PLATE-LIKE PVD ALUMINIUM PIGMENT WITH A PROTECTIVE ENCAPSULATION

The invention is directed to a plate-like PVD aluminum pigment with a protective encapsulation. Furthermore, the invention is directed to a method for manufacturing a plate-like PVD aluminum pigment with a protective encapsulation.

PVD pigments are pigments, which are obtained by physical vapor deposition (PVD), wherein metal, e.g. aluminum, is vaporized in a high vacuum and deposited as a metal foil on a substrate, e.g. a polyethylene terephthalate (PET) foil. The substrate is usually provided with a release coat to facilitate the detachment of the metal film from the substrate. The deposited metal foil is then passed through a solvent bath in order to detach the obtained metal film and to obtain coarse particles of metal foil. The metal particle can then be concentrated and washed, and further comminuted, e.g. using a speed stirrer or ultrasonic sound, in order to obtain plate-like PVD pigments of a desired particle size distribution.

The PVD pigments have an extremely flat surface and a mirror-like reflectivity of incident light. They represent the highest class of optical appearance of all metal effect pigments with regard to brightness and flop. PVD pigments are commercially available as aluminum pigments under the trademarks Metalure® of Eckart GmbH, Metasheen® of BASF SE, or Decomet® of Carl Schlenk AG.

In order to preserve the high reflectivity of the PVD pigments, it is necessary to protect PVD pigments against corrosion, which can be induced by water, humidity, chemicals, etc. of the surrounding, e.g. in a paint, lacquer, coatings, etc. PVD pigments are much more sensitive against corrosion compared to plate-like metal pigments obtained from a grinding process, wherein spherical or irregular formed metal particles are physical flattened in a ball mill to obtain the plate-like shape. One reason for the enhanced sensitivity of PVD pigments are their extremely high specific surfaces. Furthermore PVD pigments exhibit the best optical properties of metal effect pigments rendering them sensitive to even small corrosion processes. Another reason for the enhanced sensitivity may be the fact that the dispersions of commercially available PVD aluminum pigments always contain certain amounts of residual release coat material, which is usually a polymer. These residues can have negative influence of the coating process with corrosion protection layer such as silica, for example.

EP 1 619 222 A1 discloses aluminum pigments comprising aluminum particles, a molybdenum coat comprising a molybdenum oxide and/or molybdenum hydrate covering the surface of each said aluminum particles and a silica coat comprising an amorphous silica and/or a coat prepared from a silane coupling agent further covering said molybdenum coat. The aluminum pigments are obtained by grinding of aluminum particles. EP 1 619 222 A1 is not directed to PVD aluminum pigments.

DE 10 2013 113 885 A1 is directed to a metal pigment comprising a metallic substrate and an enveloping coating. The enveloping coating comprises an enveloping first layer comprising at least one metal oxide. The enveloping coating further comprises a second layer containing at least one heteropolysiloxane comprising at least one amino silane component and at least one silane component selected from the group consisting of alkylsilane, vinylsilane and arylsilane. The pigments according to the teaching of DE 10 2013 113 805 A1 show an improved stability against corrosion and chemicals. However, it turned out that the PVD-metal pigments treated with these heteropolysiloxanes do not impart corrosion stability in certain applications.

DE 10 2010 007 147 A1 is directed to metal effect pigments which are coated with silicon oxide using a sol-gel-process. The pigments pursuant to the teaching of DE 10 2010 007 147 A1 are manufactured in a two-step process, wherein the sol-gel-reaction is carried out in a first step in the presence of an acid and in a second step in the presence of a base or vice versa. These pigments can represent an appropriate balance between the covering power on the one hand and the stability against corrosion on the other hand.

WO 2016/059033 A1 is directed to a PVD metal effect pigment, which is coated with a metal oxide layer wherein the metal oxide layer amounts to 5 to 45 wt.-%, relative to the total weight of the coated metal effect pigment. The metal oxide is selected from the group consisting of silicon dioxide, aluminum oxide, titanium dioxide, iron oxide, tin oxide, zinc oxide or mixtures thereof. The PVD metal effect pigments can be provided in concentrated dispersions having content of the coated PVD metal effect pigment of 70 wt.-% or more, based on the total weight of the dispersion.

An object of the invention is to provide PVD pigments having an improved stability especially against humidity in a hardened coating system. Moreover, it is an object of the invention to provide PVD pigments having a simple structure which can be easily manufactured.

The object of the invention is solved by providing a plate-like PVD aluminum pigment with a protective encapsulation, wherein said protective encapsulation comprises (a) a continuous encapsulating silicon oxide containing coating, wherein said silicon oxide containing coating comprises at least 60 wt.-% silicon oxide, based on the total weight of the uncoated PVD pigment and (b) a layer of metal oxide, wherein said metal oxide is selected from the group consisting of molybdenum oxide, molybdenum hydroxide, molybdenum oxide hydrate, tungsten oxide, tungsten hydroxide, tungsten oxide hydrate and mixtures thereof, and (c) optionally an outer organic-chemical modification layer.

The silicon oxide containing coating is also referred to as coating (a) or as a layer (a).

The discontinuous layer of metal oxide or continuous layer of metal oxide is also referred to as layer (b). Preferably, the discontinuous layer comprises or consists of metal oxide or the continuous layer comprises or consists of metal oxide, wherein said metal oxide is selected from the group consisting of molybdenum oxide, molybdenum hydroxide, molybdenum oxide hydrate, tungsten oxide, tungsten hydroxide, tungsten oxide hydrate, and mixtures thereof.

The term "silicon oxide" containing coating (a) means that any of silicon dioxide, silicon hydroxide and silicon oxide hydrate and mixtures thereof are included. Furthermore included is silicon dioxide made by sol-gel synthesis. This sol-gel-silicon dioxide may contain unreacted groups of alkoxides, like e.g. methoxy or ethoxy. The unreacted groups may occur in a range of 1% to 50%, preferably 10% to 30% with respect to all Si—OH functionalities theoretically involved for a 100% hydrolysis of all silicon alkoxides used for forming coating (a).

The term "metal oxide" as used in combination with layer (b) means with respect to its composition any of metal oxide or a metal hydroxide or a metal oxide hydrate or a metal peroxide or a mixture of any combination of any of these species thereof. It may also contain elemental metal in an amount of 0 to 30 atom-%, preferably 0 to 25 atom-%, based on the total content of the metal forming the metal oxide (b).

The term "layer (b)" used in combination with the metal oxide means regarding to its morphology an either layer (b) on the PVD aluminum substrate or on the coating (a) or a situation, wherein the metal oxide (b) is at least partially located in a crack or a sinkhole of coating (a).

The term "PVD aluminum pigment" means a single PVD aluminum pigment or a plurality of PVD aluminum pigments.

The protective encapsulation recited in the claims serves to encapsulate the PVD aluminum pigment, which is not yet protected or stabilized against corrosion, i.e. a non-stabilized PVD aluminum pigment. Thus, the protective encapsulation can protect the PVD aluminum pigment against corrosion. Preferably, the protective encapsulation can also protect the PVD aluminum pigments when incorporated into an application medium, such as a cured coating against hydrolysis arising from humidity which penetrates into the cured coating.

Conventional metal pigments obtained by e.g. grinding methods are usually quite stable once they are incorporated into a cured coating system. In contrast, even PVD pigments coated with only a silica protective layer are prone to such kind of oxidation processes.

A hydrolysis can occur for example when an application medium like e.g. an automotive interior coating containing PVD metallic pigments is subjected to an increased temperature and under an increased humidity for a long period of time. Even in two coat-systems consisting in a basecoat containing PVD aluminum pigments and a clear coat humidity can penetrate through the clear coat and can degrade the aluminum pigments. The conditions of these kind of coatings are simulated for example in the VW test TL 226. Especially very thin PVD metal flakes are sensitive to the impact of humidity to such kind of coatings.

The inventors have found out that surprisingly PVD aluminum pigments, which are highly susceptible against corrosion, can surprisingly simply be stabilized against corrosion when applying a coating (a) which is an encapsulating silicon oxide containing coating comprising at least 60 wt.-% of silicon oxide, based on the total weight of the uncoated said silicon oxide containing coating, and a layer (b) of metal oxide, wherein said metal oxide is selected from the group consisting of molybdenum oxide, molybdenum hydroxide, molybdenum oxide hydrate, tungsten oxide, tungsten hydroxide, tungsten oxide hydrate and mixtures thereof, and c) optionally an outer organic-chemical modification layer.

PVD Aluminum Pigments:

The PVD aluminum pigment has preferably an aluminum content of at least 98 wt.-%, preferably of at least 99 wt.-%, further preferably of at least 99.9 wt.-%, further preferably of at least 99.99 wt.-%, each based on the total weight of the uncoated PVD aluminum pigment.

According to a preferred embodiment, the PVD aluminum pigment has a median diameter $d_{50}$ in the range of 2 to 30 μm, preferably 4 to 25 μm, preferably 5 to 20 μm and further preferably 6 to 18 μm.

A median diameter $d_{50}$ means that 50% of the metal pigments have a diameter of the indicated size or below. The median diameter $d_{50}$ (volume averaged) of the PVD aluminum pigments can be measured by laser granulometry, for example with CILAS 1064 (Quantachrome GmbH, Germany).

According to another embodiment of the invention, the PVD aluminum pigment has a median thickness $h_{50}$ in the range of 15 to 75 nm, preferably of 16 to 50 nm, further preferably of 19 to 40 nm. A median thickness $h_{50}$ means that 50% of the metal pigments have a thickness of the indicated size or below.

Below an $h_{50}$-value of 15 nm the aluminum PVD pigments become too dark and lose their enormous hiding power. Above 75 nm the PVD pigments lose their good orientation in the application medium and thus optical properties like gloss and flop decrease and furthermore the hiding power decreases with increasing thickness.

According to another embodiment of the invention the PVD aluminum pigment has a median diameter $d_{50}$ in the range of 6 to 18 μm and a median thickness $h_{50}$ in the range of 16 to 50 nm, preferably of 19 to 40 nm and most preferably 20 to 38 nm.

Such kind of PVD-pigments exhibit a high hiding power and a liquid metal effect.

The median thickness of the PVD aluminum pigment can be adjusted when carrying out the physical vapor deposition. Furthermore, the median thickness $h_{50}$ of the PVD aluminum pigments can be measured by counting single pigment particles in a SEM according to the method described in detail in WO 2004087816 A2 (see especially page 9, lines 12 to 17 and page 24, line 12 to page 25, line 15 herein).

According to another embodiment, the PVD aluminum pigment is formed as or with a diffraction grating with a period of preferably in a range of 5,000 to 20,000 lines/cm and more preferably in a range of 10,000 to 16,000 lines/cm. When formed as or with a diffraction grating, the PVD aluminum pigment has iridescent properties. The production of PVD aluminum pigments having a diffraction grating can be effected as described in U.S. Pat. No. 5,624,076 A. These PVD pigments are also described as embossed pigments. The process for producing embossed pigments or pigments with a diffraction grating as described in U.S. Pat. No. 5,624,076 A.

These embossed PVD pigments are composed only of very thin aluminum platelets with a primary layer thickness in a range of from about 25 to 80 nm and preferably 30 to 70 nm. The embossed PVD pigments can be produced by embossing a polymer film with a grating structure and then applying aluminum thereto by vapor deposition in a high vacuum. The aluminum film is then removed from the polymer film and the resulting film fragments are then comminuted to obtain embossed PVD pigments, as is standard practice in the production of metallic effect pigments by PVD methods. The diffractive structures comprising as many as 20,000 diffraction elements per cm can also be produced by this process. The diffraction structures are preferably grooves arranged substantially parallel to each other, i.e. formed by valleys separated from each other by ridges or peaks. The peak-to-valley heights of such structures are preferably in the range of 150 nm to 400 nm, more preferably from 175 nm to 350 nm. Of course, other diffraction structures can also be used. For example, the diffraction structures may be in the form of concentric group structures arranged within another or groove structures arranged in spiral form. It is only essential that the diffraction structure elicit the desired optical effect of a multicolored iridescence or rainbow color effect to the observer. The diffraction structures are preferably formed as reflective gratings.

Uncoated PVD aluminum pigment, which appear like mirror-like pigments, have a high metallic appearance and a high reflectivity. The PVD pigments of the present invention do have optical properties, which are nearly identical or at least very close to the optical properties of uncoated PVD aluminum pigments. According to a preferred embodiment of the invention, the PVD aluminum pigments are not colored with additional dyes or color pigments. Thus, preferably neither coating (a) nor layer (b) or any additional layer(s) comprise additional dye(s) and/or color pigment(s).

A color effect is only induced, if the PVD aluminum pigments are embossed with (a) diffraction grating(s) as described supra.

Continuous Encapsulating Silicon Oxide Containing Coating (a):

The silicon oxide containing coating comprises at least 60 wt.-% silicon oxide, preferably silicon dioxide, based on the total weight of the silicon oxide containing coating. According to a preferred embodiment the silicon oxide, preferably silicon dioxide, amounts to 70 wt.-% to 99 wt.-%, further preferably to 75 wt.-% to 95 wt.-%, for example 88 wt.-% to 92 wt.-%, based on the total weight of the silicon oxide containing coating.

According to another embodiment the silicon oxide containing coating (a) consists of silicon oxide, preferably silicon dioxide.

The term "continuous layer (a)" means that layer (a) encapsulates substantially completely, in particular completely, the respective PVD-aluminum substrate or the PVD-aluminum substrate precoated with layer (b). Such substantially complete encapsulation may, however, still comprise some cracks in the coating, which may evolve after the chemical coating has been completed. Cracks can for example evolve by a drying step of the PVD-aluminum pigment coated with layer (a).

The silicon oxide containing coating may comprise further metal oxide(s), metal oxide hydroxide(s), and/or metal oxide hydrate(s), wherein said metal is preferably selected from the group consisting of aluminum, zinc, tin, zirconium, cerium and mixtures thereof, further preferably from the group consisting of aluminum, zinc, tin, zirconium, and mixtures thereof, and further preferably from aluminum. The amount of the further metal oxide(s), metal oxide hydroxide(s), and/or metal oxide hydrate(s) can be in range of up to 30 wt.-%, further preferably in a range of 1 wt.-% to 25 wt.-%, further preferred of 5 to 20 wt.-%, further preferred in a range from 8 wt.-% to 12 wt.-%, based on the total weight of the silicon oxide containing coating.

The continuous silicon oxide containing coating, preferably silicon dioxide coating, has preferably an average thickness of from 15 nm to 60 nm, further preferably from 18 nm to 55 nm, further preferably of from 20 nm to 50 nm, further preferably of from 25 nm to 45 nm and most preferably of from 30 nm to 40 nm.

If a transparent coating, such as a silicon oxide containing coating, is thicker than 60 nm the covering power is significantly reduced and also the optical properties of the PVD aluminum pigment are impaired. The covering power is the ability to cover an underground, so that the underground does not shine through the applied application medium, such as a paint, lacquer or coating. If the thickness of coating (a) is below 15 nm the corrosion stability of the PVD aluminum pigment declines and the pigment becomes too thin for a good coverage power. Furthermore, such thin metal pigment become too dark in their appearance.

According to another embodiment of the invention the silicon oxide containing coating amounts to 8 wt.-% to 25 wt.-%, preferably 10 wt.-% to 22 wt.-%, further preferably 12 wt.-% to 20 wt.-% and most preferably 14 wt.-% to 18 wt.-%, each based on the weight of the uncoated PVD aluminum pigment. The optimum amount can be adjusted by those skilled in the art depending on the size and specific surface of the PVD aluminum pigment.

Below 8 wt.-% the corrosion stability is too low. Above 25 wt.-% the high class optical properties of the PVD aluminum pigment may be impaired.

In a further embodiment the silicon oxide containing coating (a) contains silicon oxide, preferably silicon dioxide, in an amount of at least 60 wt.-%, further preferably at least 70 wt.-%, further preferably at least 80 wt.-%, further preferably at least 95 wt.-%, each based on the total weight of the silicon oxide containing coating (a).

In another embodiment, the remaining compounds up to 100 wt.-% in the silicon oxide containing coating (a) comprise or consist of organic groups thus forming a hybride silicon oxide/organic coating.

In certain embodiments this organic material comprises or consists of organic oligomers and/or polymers. That is to say, the silicon oxide containing coating can be formed as a hybrid layer of silicon oxide, preferably silicon dioxide, and organic oligomers and/or organic polymers, which preferably penetrate each other. Such kind of hybrid coatings can be made by simultaneous formation of silicon oxide (preferably by a sol-gel synthesis) and the formation of a polymer or oligomer. Thus, the hybrid layer is preferably an essentially homogeneous layer in which the silicon oxide, preferably silicon dioxide, and organic oligomer(s) and/or organic polymer(s) are essentially uniformly distributed within the coating (a). Metal effect pigments coated with such hybrid layers are disclosed in EP 1812519 B1 or in WO 2016/120015 A1. Such hybrid layers enhance the mechanical properties of the coating (a).

According to another embodiment of the invention, the silicon oxide containing coating (a) contains 70 to 95 wt.-%, preferably 80 to 90 wt.-%, silicon oxide, preferably silicon dioxide, and 5 to 30 wt.-%, preferably 10 to 20 wt.-% of organic oligomer and/or organic polymer, each based on the total weight of the silicon oxide containing layer.

According to another embodiment of the invention, the silicon oxide, preferably silicon dioxide, and the organic oligomer(s) and/or organic polymer(s) are not covalently bonded to each other.

According to another embodiment of the invention, the silicon oxide, preferably silicon dioxide, and the organic oligomer(s) and/or organic polymer(s) can be at least partially covalently bonded to each other.

The at least partial covalent bonding of the silicon oxide network to the organic oligomer and/or polymer can take place via at least one organic network former. Network formers are reagents which can bind to both the silicon oxide network and to the organic oligomer and/or polymer.

Organofunctional silane(s) are preferred for use as organic network formers. The organofunctional silane(s) can bind to the silicon oxide network following the hydrolysis of a hydrolysable group. By way of hydrolysis, the hydrolysable group is usually substituted by an OH group, which then forms a covalent bond with OH groups in the inorganic silica network with condensation. The hydrolysable group is preferably halogen, hydroxyl, or alkoxy having from 1 to 10 carbon atoms preferably 1 to 2 carbon atoms, which may be linear or branched in the carbon chain, and mixtures thereof.

Suitable organofunctional silanes are, for example, many representatives produced by Evonik (Untere Kanalstrasse 3, D-79618 Rheinfelden) and products sold under the trade name "Dynasylan". For example, 3-methacryloxypropyl trimethoxysilane (Dynasylan MEMO) can be used to form a (meth)acrylate or polyester, vinyl tri(m)ethoxysilane (Dynasylan VTMO or VTEO) to form a vinyl polymer, 3-mercaptopropyl tri(m)ethoxysilane (Dynasylan MTMO or 3201) for copolymerization in rubber polymers, aminopropyl trimethoxysilane (Dynasylan AMMO) or N2-aminoethyl-3-aminopropyl trimethoxysilane (Dynasylan DAMO) to form a β-hydroxylamine or 3-glycidoxypropyl trimethoxysilane (Dynasylan GLYMO) to form a urethane network or polyether network.

Other examples of silanes with vinyl or (meth)acrylate functionalities are: isocyanato triethoxy silane, 3-isocyanatopropoxyl triethoxy silane, vinyl ethyl dichlorosilane, vinyl methyl dichlorosilane, vinyl methyl diacetoxy silane, vinyl methyl diethoxy silane, vinyl triacetoxy silane, vinyl trichlorosilane, phenyl vinyl diethoxy silane, phenyl allyl diethoxy silane, phenyl allyl dichlorosilane, 3-methacryloxypropyl triethoxy silane, methacryloxy propyl trimethoxy silane, 3-acryloxypropyl trimethoxy silane, 2-methacryloxyethyl tri-(m)ethoxy silane, 2-acryloxyethyl tri(m)ethoxy silane, 3-methacryloxypropyl tris(methoxyethoxy)silane, 3-methacryloxypropyl tris(butoxyethoxy)silane, 3-methacryloxypropyl tris(propoxy)silane or 3-methacryloxypropyl tris(butoxy)silane.

In a preferred development of the invention, both silicon oxide, preferably silicon dioxide, and an organic network of oligomers and/or polymers are present, preferably exhibiting interpenetration.

For the purposes of the present invention, "organic oligomers" in the mixed layer are taken to mean the term usually employed in polymer chemistry: i.e. the linkage of from two to twenty monomer units (Hans-Georg Elias, "Makromoleküle" 4th Edition 1981, Huethig & Wepf Verlag Basel). Polymers are linkages of more than twenty monomer units.

The average chain length of the organic segments can be varied by varying the ratio of monomer concentration to the concentration of organic network formers. The average chain length of the organic segments is from 2 to 10,000 monomer units, preferably from 3 to 5,000 monomer units, more preferably from 4 to 500 monomer units and even more preferably from 5 to 30 monomer units.

Furthermore, in other embodiments the organic polymers have an average chain length of from 21 to 15,000 monomer units, more preferably from 50 to 5,000 monomer units and most preferably from 100 to 1,000 monomer units, for use as the organic component.

In another embodiment of the invention the silicon oxide containing layer (a) consists in a mixed layer of silicon oxide, preferably silicon dioxide and organofunctional silanes, which have functional groups which are not polymerized or oligomerized. Such kind of organofunctional silanes are called network modifiers and metal pigments coated with such kind of hybrid layer are described in WO 2015/013762 A1.

Preferably, the network modifiers are organofunctional silanes with the formula $$R_{(4-z)}Si(X)_z \quad (I)$$

In this formula, z is an integer from 1 to 3, R is an unsubstituted, unbranched or branched alkyl chain having 1 to 24 C atoms or an aryl group having 6 to 18 C atoms or an arylalkyl group having 7 to 25 C atoms or mixtures thereof, and X is a halogen group and/or preferably an alkoxy group. Preference is given to alkylsilanes having alkyl chains in a range of 1 to 18 C atoms or to aryl silanes having phenyl groups. R may also be joined cyclically to Si, in which case z is typically 2. X is most preferably ethoxy or methoxy.

Preferred examples of such network modifying organofunctional silanes are alkyl or aryl silanes. Examples for these silanes are butyltrimethoxysilane, butyltriethoxysilane, octyltrimethoxysilane, octyltriethoxysilane, decyltrimethoxysilane, decyltrimethoxysilane, hexadecyltrimethoxysilane, hexadecyltriethoxysilane, phenyltrimethoxysilane, phenyltriethoxysilane, diphenyldimethoxysilane, diphenyldiethoxysilane and mixtures thereof.

Layer (b) of Metal Oxide:

Layer (b) can be either a discontinuous layer or a continuous layer of metal oxide.

The term "continuous layer (b)" means that layer (b) encapsulates substantially completely, in particular completely, the respective PVD-aluminum substrate, e.g., the continuous silicon oxide containing coating (a), which in turn encapsulates the plate-like PVD aluminum pigment.

The term "discontinuous layer" or "discontinuous layer (b)" means that layer (b) only partially encapsulates the respective substrate, e.g., the continuous silicon oxide containing coating (a) or the plate-like PVD aluminum pigment. A partial encapsulation means that the respective substrate is not fully coated. The partial encapsulation or discontinuity can be realized, e.g., in the form of islands of layer (b) on the respective substrate.

According to an embodiment of the invention, the layer (b) comprises or consists of metal oxide wherein said metal oxide is selected from the group consisting of molybdenum oxide, molybdenum hydroxide, molybdenum oxide hydrate, molybdenum peroxides and mixtures thereof. The molybdenum oxide usually is a mixture of different species and may involve coordination type species. It may be represented by the compositional formula:

$$MoO_3 mH_2O_2 \cdot nH_2O \text{ or } MoO_{3-m}(O_2)_m \cdot nH_2O \quad (II)$$

wherein Mo is molybdenum, O is oxygen, $0 \le m \le 1$ and $1 \le n < 2$.

Also molybdenum complexes involving different ligands selected from the group of water, $O_2$, O and mixtures thereof may be included.

Furthermore, layer (b) may also contain elemental molybdenum in an amount of 0 to 30 atom-%, preferably 0 to 25 atom-% and most preferably 3 to 20 atom-%, each based on the total content of the molybdenum forming the metal oxide (b).

The amount of elemental molybdenum may be determined with XPS.

Preferably, the molybdenum oxide coat is prepared by first preparing a solution of polymolybdic acid peroxide by dissolving molybdenum oxide or elemental molybdenum in a hydrogen oxide solution (see for example Solid States Ionics, pp. 507-512, 1992).

According to another embodiment the layer (b) comprises or consists of metal oxide, wherein said metal oxide is selected from the group consisting of tungsten oxide, tungsten hydroxide, tungsten oxide hydrate, tungsten peroxide and mixtures thereof. Also tungsten complexes involving different ligands selected from the group of water, 02, 0 and mixtures thereof may be included. Furthermore, layer (b) of this embodiment may also contain elemental tungsten in an amount of 0 to 30 atom-%, preferably 0 to 25 atom-% and most preferably 3 to 20 atom-%, each based on the total content of the tungsten forming the metal oxide (b). The amount of elemental tungsten may be determined with XPS.

Preferably, the tungsten oxide coat is prepared by first preparing a solution of polytungstentic acid peroxide by dissolving tungsten oxide or elemental tungsten in a hydrogen oxide solution.

The finding of the inventors of the enhanced corrosion stability, especially hydrolysis-stability of the PVD-aluminum pigments coated with coating (a) and layer (b) is surprising. Especially surprising is the enhanced stability in case that layer (b) can be discontinuous. Especially the effectiveness of a discontinuous layer regarding the improvement of the protective encapsulation of plate-like PVD aluminum pigments shows that the effect is not due to a simple addition of a first completely encapsulating layer and a second completely encapsulating layer. Rather the two layers seem to have a synergetic effect in their effectiveness to impart corrosion stability to the PVD aluminum pigments.

Irrespective that the synergetic effect that is not yet understood, the specific combinations of the silicon oxide containing coating, forming predominantly by mass protective encapsulation, and a small amount of metal oxide, metal hydroxide, and/or metal oxide hydrate, which is deposited as layer (b), allows to provide a plate-like PVD aluminum pigment with an improved protective encapsulation.

According to another preferred embodiment of the invention the layer (b) of metal oxide amounts to 0.01 to 0.4 wt.-%, calculated as elemental molybdenum or 0.01 to 0.8 wt.-% for elemental tungsten, calculated each based on the weight of the uncoated PVD aluminum pigment. According to another preferred embodiment, the layer (b) of metal oxide amounts to 0.015 to 0.35 wt.-%, further preferably from 0.02 to 0.3 wt.-%, each calculated as elemental molybdenum and based on the weight of the uncoated PVD aluminum pigment. According to another preferred embodiment, the layer (b) of metal oxide amounts to 0.02 to 0.6 wt.-%, further preferably from 0.05 to 0.5 wt.-%, each calculated as elemental tungsten and based on the weight of the uncoated PVD aluminum pigment.

Surprisingly, the anticorrosion effect of the coated PVD metal pigment could be obtained with very low amounts of metal oxide.

The amount of molybdenum or tungsten as well as the amount of $SiO_2$ is determined by optical emission spectrometry (ICP-OES).

According to another embodiment of the invention the layer (b), comprising or consisting of metal oxide, at least partially extends into the silicon oxide containing coating.

By extending into the silicon oxide containing coating (a), deficiencies, such as cracks, for example micro-cracks, sinkholes, pinholes, pores etc., are at least partially filled in the coating (a) and/or covered at least partially on the coating (a) which is assumed to be important in order to improve the protective encapsulation.

According to a preferred embodiment of the invention, the metal oxide forms a discontinuous layer (b). Preferably, the discontinuous layer (b) comprises or consists of islands of said metal oxide.

Islands are discrete areas of metal oxide which are not connected to other areas of metal oxide.

Outer Organic-Chemical Modification Layer:

According to another preferred embodiment the plate-like PVD aluminum pigment comprises an outer-organic chemical modification layer.

In a preferred embodiment this outer organic-chemical modification layer comprises at least one organofunctional silane.

Preferably, the outer organic-chemical modification layer comprises at least a first silane with a coupling group.

The silane(s) may alternatively be organofunctional silane(s), which allow chemical attachment to a plastic, a binder of a paint or of an ink, etc.

The organofunctional silanes which are used preferably as surface modifiers and which have suitable functional groups are available commercially and are produced, for example, by Evonik and sold under the trade name Dynasylan®. Further products may be purchased from Momentive Performance Materials (Silquest® silanes) or from Wacker (Geniosil® product group).

Examples of these products are 3-methacryloyloxypropyltrimethoxysilane (Dynasylan MEMO, Silquest A-174NT), vinyltri(m)ethoxysilane (Dynasylan VTMO or VTEO, Silquest A-151 or A-171), methyltri(m)ethoxysilane (Dynasylan MTMS or MTES), 3-mercaptopropyltrimethoxysilane (Dynasylan MTMO; Silquest A-189), 3-glycidyloxypropyltrimethoxysilane (Dynasylan GLYMO, Silquest A-187), tris[3-(trimethoxysilyl)propyl] isocyanurate (Silquest Y-11597), bis[3-(triethoxysilyl)propyl)] tetrasulfide (Silquest A-1289), bis[3-(triethoxysilyl)propyl disulfide (Silquest A-1589, beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl)(m)ethyldimethoxysilane (GENIOSIL XL 32, XL 34), (isocyanatomethyl)methyldimethoxysilane, (isocyanatomethyl)trimethoxysilane, 3-(triethoxysilyl)propylsuccinic anhydride (GENIOSIL GF 20), (methacryloyloxy-methyl)methyldiethoxysilane, 2-acryloyloxyethylmethyldimethoxysilane, 2-methacryloyloxyethyltrimethoxysilane, 3-acryloyloxypropylmethyldimethoxysilane, 2-acryloyloxyethyltrimethoxy-silane, 2-methacryloyloxyethyltriethoxysilane, 3-acryloyloxypropyltrimethoxysilane, 3-acryloyloxypropyltripropoxysilane, 3-methacryloyloxypropyltriethoxysilane, 3-methacryloyloxy-propyltriacetoxysilane, 3-methacryloyloxypropylmethyldimethoxysilane, vinyltrichlorosilane, vinyltrimethoxysilane (GENIOSIL XL 10), vinyltris(2-methoxyethoxy) silane (GENIOSIL GF 58), and vinyltriacetoxysilane.

As organofunctional silanes it is preferred to use 3-methacryloyloxypropyltrimethoxysilane (Dynasylan MEMO, Silquset A-174NT), vinyltri(m)ethoxysilane (Dynasylan VTMO or VTEO, Silquest A-151 or A-171), methyltri(m)ethoxysilane (Dynasylan MTMS or MTES), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl)(m)ethyldimethoxysilane (GENIOSIL XL 32, XL 34), 3-(triethoxysilyl)propylsuccinic anhydride (GENIOSIL GF 20), vinyltrimethoxysilane (GENIOSIL XL 10) and/or vinyltris(2-methoxyethoxy)silane (GENIOSIL GF 58).

It is, however, also possible to apply other and/or additional organofunctional silanes to the coated PVD aluminum pigments of the invention.

It is additionally possible to use aqueous prehydrolyzates that are obtainable, for example, commercially from Evonik. These include, among others, aqueous aminosiloxane (Dynasylan Hydrosil 1151), aqueous amino-/alkyl-functional siloxane (Dynasylan Hydrosil 2627 or 2909), aqueous diamino-functional siloxane (Dynasylan Hydrosil 2776), aqueous epoxy-functional siloxane (Dynasylan Hydrosil 2926), amino-/alkyl-functional oligosiloxane (Dynasylan 1146), vinyl-/alkyl-functional oligosiloxane (Dynasylan 6598), oligomeric vinylsilane (Dynasylan 6490) or oligomeric short-chain alkyl-functional silane (Dynasylan 9896).

Pursuant to another embodiment of the invention the outer organic-chemical modification layer comprises a second silane without a coupling group.

In a further-preferred embodiment, the silane without a coupling group is an alkylsilane. The alkylsilane preferably has a formula according to formula (I) mentioned above as a network modifier:

$$R_{(4-z)}Si(X)_z \quad (I)$$

For the alkylsilanes as part of the outer organic-modification layer R is an unsubstituted, unbranched or branched alkyl chain having a range of 1 to 24 C atoms, preferably in a range of 6 to 18 C atoms and X is preferably an alkoxy group, most preferably methoxy or ethoxy.

At or on the surface of the PVD aluminum pigment coated with layer a) and b) according to the invention, in addition to the aforementioned silanes and silane mixtures, there may also be further organic-chemical modifiers arranged, such as, for example, substituted or unsubstituted alkyl radicals, polyethers, thioethers, siloxanes, etc., and mixtures thereof.

In a preferred embodiment, the organofunctional silane mixture comprises at least one amino-functional silane as well as at least one silane without a functional binding group. The amino function is a functional group, which is able to enter into one or more chemical interactions with the majority of groups that are present in binders. This may involve a covalent bond, such as with isocyanate functions or carboxylate functions of the binder, for example, or hydrogen bonds such as with OH functions or COOR functions, or else ionic interactions. An amino function is therefore very highly suitable for the purpose of the chemical attachment of the coated PVD aluminum pigments to different kinds of binders.

For this purpose it is preferred to take the following compounds: 3-aminopropyltrimethoxysilane (Dynasylan AMMO; Silquest A-1110), 3-aminopropyltriethoxysilane (Dynasylan AMEO), [3-(2-aminoethyl)aminopropyl] trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltri-methoxysilane (Silquest Y-9669), 4-amino-3,3-dimethylbutyltrimethoxysilane (Silquest A-1637), N-cyclohexylaminomethylmethyldiethoxysilane (GENIOSIL XL 924), N-cyclohexylaminomethyltriethoxysilane (GENIOSIL XL 926), N-phenylaminomethyltrimethoxysilane (GENIOSIL XL 973), and mixtures thereof.

Via the surface modification it is possible, for example, to modify and/or set the hydrophilicity or hydrophobicity of the pigment surface. For example, via the surface modification, it is possible to modify and/or set the leafing or non-leafing properties of the PVD aluminum pigments of the invention. By leafing it is meant that, in an application medium, such as a coating, or a print, for example, the PVD aluminum pigments of the invention take up a position at or close to the upper interface or surface of the application medium.

The surface modifiers may also have reactive chemical groups, such as, for example, acrylate, methacrylate, vinyl, isocyanate, cyano, epoxy, hydroxyl or amino groups or mixtures thereof.

These chemically reactive groups allow chemical attachment, especially formation of covalent bonds, to the application medium or to components of the application medium, such as binders, for example. By this means it is possible to make improvements in, for example, the chemical and/or physical properties of cured varnishes, paints or printing inks, such as resistance to environmental influences such as humidity, insolation, UV resistance, etc., or with respect to mechanical influences, examples being scratches, etc.

The chemical reaction between the chemically reactive groups and the application medium or components of the application medium may be induced, for example, by irradiation of energy, in the form of UV radiation and/or heat.

In further embodiments the PVD aluminum pigments coated with layers (a) and (b) can be further coated with an organic coating layer thereon to impart even stronger corrosion stability. Such organic coating is preferably made of acrylates and/or methacrylates.

In a further embodiment a silane with a functional group comprising unsaturated carbon-carbon bonds capable for polymerization like a methacrylate silane, an acrylate silane or a vinylsilane may be employed as the outer-chemical organic modification and that a further polymer may be formed thereon build from methacrylate or acrylate monomers. Such kind of polymerization is described for example in DE 102011103882 A1 or in EP 1953195 A1.

Preferred Coating Systems of PVD Aluminum Pigments:

According to a preferred embodiment of the invention the PVD aluminum pigment is first encapsulated by silicon oxide containing coating (a) and then provided with the metal oxide of layer (b).

The order of the two coatings (a) and (b) of this embodiment can be determined by XPS (X-ray Photoelectron Spectroscopy) in combination with sputtering techniques.

According to this embodiment the continuous silicon oxide containing coating, which is preferably a silicon dioxide coating, is applied directly to the uncoated or non-stabilized PVD aluminum pigment. The continuous silicon oxide containing coating completely encapsulates the PVD aluminum pigment. When depositing the metal vapor on the substrate during the production of the PVD aluminum pigment, a release layer is usually applied to the substrate to facilitate the detachment. Therefore, although the PVD aluminum pigment is usually washed after detachment from the substrate, residues of the release coat may still be present on the surface of the PVD aluminum pigment. When stating that the continuous silicon oxide containing coating is directly applied to the uncoated or non-stabilized PVD aluminum pigment, this also comprises that any residual release coat may be encapsulated as well by the continuous silicon oxide containing coating (a).

According to a preferred embodiment of the invention the surface of the plate-like PVD aluminum pigment is untreated or not coated separately with anti-corrosive agents such as, for example, treatment with $H_2O_2$, organo-phosphorous compounds such as esters of phosphoric acid, substituted phosphoric acid derivate, organic phosphonic acids, phosphoric acid, boric acid, anti-corrosive pigments, chromic acid, etc.

That is to say, the starting plate-like PVD aluminum pigment is preferably an uncoated or non-stabilized PVD aluminum pigment, which is coated directly with a continuous silicon oxide containing coating encapsulating said uncoated or non-stabilized PVD aluminum pigment.

According to another preferred embodiment, layer (b) is a discontinuous layer comprising or consisting of metal oxide or a continuous layer of metal oxide, wherein said metal oxide is selected from the group consisting of molybdenum oxide, molybdenum hydroxide, molybdenum oxide hydrate, tungsten oxide, tungsten hydroxide, tungsten oxide hydrate, and mixtures thereof, which is directly applied to coating (a).

Consequently, according to a preferred embodiment of the invention, an uncoated or non-stabilized plate-like PVD aluminum pigment, preferably PVD aluminum pigment, is directly coated with coating (a), which is a continuous silicon oxide containing coating directly encapsulating said uncoated or non-stabilized PVD aluminum pigment. The continuous silicon oxide containing oxide is preferably a silicon dioxide coating. Furthermore, it is preferred that the layer (b) is directly applied to the coating (a), i.e. without any intermediate layer between coating (a) and layer (b).

Preferably, the plate-like PVD aluminum pigment, which is preferably an uncoated or non-stabilized plate-like PVD aluminum pigment, is directly coated with a continuous silicon oxide containing coating (a), directly encapsulating said PVD aluminum pigment, and wherein metal oxide layer (b) comprises or consists of tungsten oxide, tungsten hydroxide, tungsten oxide hydrate or a mixture thereof.

More preferably, the plate-like PVD aluminum pigment, which is preferably an uncoated or non-stabilized plate-like PVD aluminum pigment, is directly coated with a continuous silicon oxide containing coating (a), directly encapsulating said PVD aluminum pigment, and wherein metal oxide layer (b) comprises or consists of molybdenum oxide, molybdenum hydroxide, molybdenum oxide hydrate, or a mixture thereof.

The fact that these particular two coating embodiments also lead to enhanced corrosion stability is completely unexpected. In EP 1 619 222 A1 only a first coating of molybdenum oxide followed by a silica coating has been reported to enhance gassing stability of conventional aluminum pigments.

This result is especially astonishing as there is no direct contact of the metal oxide of layer (b) to the aluminum substrate, which would be assumed to be necessary for any electrochemical interaction.

According to another preferred embodiment, layer (b) is a discontinuous layer comprising or consisting of metal oxide, wherein said metal oxide is selected from the group consisting of molybdenum oxide, molybdenum hydroxide, molybdenum oxide hydrate, tungsten oxide, tungsten hydroxide, tungsten oxide hydrate, and mixtures thereof.

According to another preferred embodiment, layer (b) is a discontinuous layer comprising or consisting of metal oxide selected from the group consisting of molybdenum oxide, molybdenum hydroxide, molybdenum oxide hydrate, and mixtures thereof.

Surprisingly, it is not necessary to apply a continuous layer of metal oxide as layer (b).

A continuous layer (b) of metal oxide means that this layer encapsulates substantially completely, in particular completely, the continuous silicon oxide containing coating (a).

A discontinuous layer (b) of metal oxide comprises or consists of islands comprising or consisting of the respective metal oxide and, thus, layer (b) only partially encapsulates the continuous silicon oxide containing coating (a).

According to another embodiment of the invention, the continuous silicon oxide containing coating is directly applied to and in physical contact with the plate-like PVD aluminum pigment, preferably, an uncoated or non-stabilized plate-like PVD aluminum pigment.

According to another embodiment of the invention, layer (b) is directly applied to and in physical contact with coating (a), and wherein layer (b) preferably comprises or consists of islands comprising or consisting of the respective metal oxide.

In a further preferred embodiment the PVD aluminum pigment, which is preferably an uncoated or non-stabilized PVD aluminum pigment, is directly coated with a continuous silicon oxide containing coating (a), directly encapsulating said PVD aluminum pigment, and wherein layer (b) is a discontinuous or continuous layer comprising or consisting of tungsten oxide, tungsten hydroxide, tungsten oxide hydrate or a mixture thereof or molybdenum oxide, molybdenum hydroxide, molybdenum oxide hydrate, or a mixture thereof. The thickness of the continuous silicon oxide containing coating (a) is in a range of 25 to 45 nm.

According to another embodiment of the invention, the continuous silicon oxide containing coating is directly applied to and in physical contact with the plate-like PVD aluminum pigment, preferably, an uncoated or non-stabilized plate-like PVD aluminum pigment, wherein layer (b) is directly applied to and in physical contact with coating (a), and wherein layer (b) preferably comprises or consists of islands comprising or consisting of the respective metal oxide, and wherein to the surface of this embodiment directly and in physical contact an outer organic-chemical modification is attached. Due to the discontinuity of layer (b) the outer organic-chemical modification is attached also directly to coating (a), if not coated with layer (b), and layer (b).

In particular, if the outer organic-chemical modification layer comprises at least a first silane with a coupling group and optionally also a silane without a coupling group, the silanol group of these silanes can directly condense with silanol groups of coating (a).

Although the silanes with or without coupling groups can also react with molybdenum oxide, molybdenum hydroxide, molybdenum oxide hydrate on the one hand or tungsten oxide, tungsten hydroxide, tungsten oxide hydrate on the other hand, the chemical reaction between the silanol group of the silane and the silanol group of the continuous silicon oxide containing coating is chemically preferred. Consequently, the silanes with and without a coupling group can be reliably attached to the surface of coating (a) of the PVD aluminum pigment of the present invention. In case that layer b) follows the layer a) the silanes will probably also at least partially coat layer b).

According to another preferred embodiment of the invention, the PVD aluminum pigment is first provided with a metal oxide layer (b) and subsequently encapsulated continuously by silicon oxide containing coating (a).

The order of the two coatings (a) and (b) of this embodiment can be determined by XPS (X-ray Photoelectron Spectroscopy) in combination with sputtering techniques.

In a preferred embodiment the plate-like PVD aluminum pigment, which is preferably an uncoated or non-stabilized plate-like PVD aluminum pigment, is directly coated with a layer (b) comprising or consisting of tungsten oxide, tungsten hydroxide, tungsten oxide hydrate or a mixture thereof and wherein the continuous silicon oxide containing coating (a) directly encapsulates said PVD aluminum pigment, coated with a first layer (b).

In a further preferred embodiment the plate-like PVD aluminum pigment, which is preferably an uncoated or non-stabilized plate-like PVD aluminum pigment, is directly coated with a metal oxide layer (b) comprising or consisting of molybdenum oxide, molybdenum hydroxide, molybdenum oxide hydrate or a mixture thereof and wherein the continuous silicon oxide containing coating (a) directly encapsulates said PVD aluminum pigment, coated with a first layer (b).

According to another embodiment of the invention, layer (b) is directly applied to and in physical contact with the plate-like PVD aluminum pigment, preferably an uncoated or non-stabilized plate-like PVD aluminum pigment, and wherein layer (b) preferably comprises or consists of islands comprising or consisting of the respective metal oxide.

According to another embodiment of the invention, the continuous silicon oxide containing coating (a) is directly applied to and in physical contact with layer (b), if layer (b) is a continuous layer encapsulating the PVD aluminum pigment, preferably, an uncoated or non-stabilized plate-like PVD aluminum pigment.

According to another embodiment of the invention, the continuous silicon oxide containing coating (a) is directly applied to and in physical contact with layer (b) and the plate-like PVD aluminum pigment, if layer (b) is a discontinuous layer only partially encapsulating the plate-like PVD aluminum pigment, preferably, an uncoated or non-stabilized plate-like PVD aluminum pigment.

According to another embodiment of the invention, layer (b) is directly applied to and in physical contact with the plate-like PVD aluminum pigment, preferably, a non-stabilized plate-like PVD aluminum pigment, wherein coating (a) is directly applied to and in physical contact with layer (b), and wherein layer (b) preferably comprises or consists of islands comprising or consisting of the respective metal oxide, and wherein to the surface of this embodiment directly and in physical contact an outer organic-chemical modification is attached. Due to the discontinuity of layer (b), coating (a) is also in direct physical contact with the plate-like PVD aluminum pigment, preferably a non stabilized plate-like PVD aluminum pigment, if the plate-like PVD aluminum pigment is not directly coated with layer (b).

In a further preferred embodiment the PVD aluminum pigment, which is preferably an uncoated or non-stabilized PVD aluminum pigment, is directly coated with a layer (b) being a discontinuous or continuous layer comprising or consisting of molybdenum oxide, molybdenum hydroxide, molybdenum oxide hydrate or a mixture thereof or tungsten oxide, tungsten hydroxide, tungsten oxide hydrate or a mixture thereof and wherein the continuous silicon oxide containing coating (a), directly encapsulating said PVD aluminum pigment, coated with a first layer (b) and the thickness of the continuous silicon oxide containing coating (a) is in a range of 25 to 45 nm.

In particular, if the outer organic-chemical modification layer comprises at least a first silane with a coupling group and optionally also a silane without a coupling group, the silanol group of the silanes can directly condense with reactive groups of layer (b) such as hydroxyl or silanol groups.

Surprisingly, the protective encapsulation of the plate-like PVD aluminum pigment is also improved or superior when layer (b) is applied first and coating (a) is applied after layer (b).

Even if layer (b) is applied as a discontinuous layer of metal oxide directly on a plate-like PVD aluminum pigment, preferably a non-stabilized plate-like PVD aluminum pigment, the protective encapsulation is improved as well.

In a further embodiment the layer (b) can be applied both before and after the encapsulation of the PVD aluminum pigment, with the silicon oxide containing coating (a).

Method of Manufacturing:

The invention is also directed to a method for manufacturing a plate-like PVD aluminum pigment with a protective coating as described in the sections above.

The protective encapsulation wherein said method comprises the following subsequent steps:

(a1) contacting a soluble silicon alkoxide compound dissolved in a solvent and plate-like PVD aluminum pigments and forming plate-like PVD aluminum pigments encapsulated with a substantially continuous silicon oxide containing coating by a sol-gel process, (b1) contacting a soluble metal compound dissolved in a solvent and the plate-like PVD aluminum pigments obtained in step (a1) to envelop the pigments of step (a1) with at least a layer of metal oxide, wherein said metal of said soluble metal compound is selected from the group consisting of molybdenum, tungsten and mixtures thereof, to obtain plate-like PVD pigments with a protective encapsulation, (c1) optionally forming an outer organic-chemical modification layer with at least one organofunctional silane;

or (a2) contacting a soluble metal compound dissolved in a solvent and plate-like PVD aluminum pigments to obtain plate-like PVD aluminum pigments with at least layer of metal oxide, wherein said metal of said soluble metal compound is selected from the group consisting of molybdenum, tungsten and mixtures thereof, (b2) contacting a soluble silicon alkoxide compound dissolved in a solvent and the plate-like PVD aluminum pigments obtained in step (a2) to obtain plate-like PVD aluminum pigments encapsulated with a substantially continuous silicon oxide containing coating by sol-gel process, to obtain plate-like PVD pigments with a protective encapsulation and (c2) optionally forming an outer organic-chemical modification layer with at least one organofunctional silane.

The application of a layer (b) can be controlled by the addition of the amount and/or dilution of the soluble metal compound used for the generation of the metal oxide, metal hydroxide, and/or metal oxide hydrate of layer (b).

The two subsequent steps (a1) and (b1) or (a2) and (b2) can be done in one-pot synthesis route or in a two-pot synthesis, wherein a step of separation of the PVD aluminum pigments coated with a first coating either from step (a1) or step (a2) from the solvent and redispersing in a solvent before the second coating step in involved. In the two-step synthesis the solvents used for the subsequent coating steps may be the same or may be different.

The solvent used for dissolving the soluble metal compound can be water or an organic solvent or a mixture thereof. Preferably water is used as solvent. As the amount of water used may also influence the sol-gel process for forming coating (a), the concentration of the soluble metal compound should be high in order to use a minimum amount of water.

In a preferred embodiment the soluble molybdenum compound is prepared by first preparing a solution of polymolybdic acid peroxide by dissolving molybdenum oxide or elemental molybdenum in a hydrogen oxide solution (see for example Solid States Ionics, pp. 507-512, 1992). Likewise, a preferred soluble tungsten compound is prepared by first preparing a solution of polytungstenic acid peroxide by dissolving tungsten oxide or elemental tungsten in a hydrogen oxide solution.

The silicon oxide of layer (a) is preferably applied using the sol-gel-method.

Such a sol-gel process starts from alkoxysilane, which is reacted under catalysis with small amounts of water to form silanol groups and alcohol. The PVD aluminum pigments are dispersed in an organic solvent, e.g. an alcoholic phase, and then the alkoxysilanes, water, and at least one basic or acidic catalyst is added with accompanying supply of heat. The alkoxysilane(s) can also be added to the PVD aluminum pigments dispersed in an organic solvent.

The silanol groups condense with elimination of water to form a Si—O—Si network. This Si—O—Si network then precipitates in the form of a gel onto the metallic effect pigments, as a result of which they become enveloped or encapsulated with silicon oxide, preferably $SiO_2$.

In the course of the reaction, a compact network of silicon dioxide develops on the surface of the pigment and completely encapsulates the pigment particles. Furthermore, the silicon dioxide coating freshly precipitated onto the pigment surface can be specifically subjected to further surface modifications. For example, silanes having at least one nonhydrolyzable substituent, examples being alkylsilanes, can be added after the application of the $SiO_2$ coating and can be hydrolyzed in situ, with the silanes having at least one nonhydrolyzable substituent being firmly anchored, via further condensation reactions, to and on the silicon dioxide layer on the pigment surface.

The alkoxysilane used in accordance with the invention preferably comprises di-, tri- and/or tetraalkoxysilanes. Tetraalkoxysilane is especially preferred. When tetraalkoxysilane is used, the hydrolysis results in formation of four silanol groups, which, with condensation, produce a high degree of crosslinking, i.e., a silicon oxide coating, preferably $SiO_2$ coating, having a good barrier effect. When di- or trialkoxysilanes are used, hydrolysis, accordingly, produces two or three silanol groups, which are able to condense to form a Si—O—Si network. The use of di- or trialkoxysilanes permits the introduction of organic groups, as for example of alkyl groups, or aryl groups or polymers into the silicon oxide coating, to form an inorganic-organic hybrid layer. The di- or trialkoxysilanes can also be dubbed organosiloxanes.

An alkoxysilane in accordance with the invention is any monomeric or polymeric silicon compound having at least one alkoxy group. Tetraalkoxysilane used advantageously comprises tetramethoxysilane, tetraethoxysilane, tetraisopropoxysilane, and condensates thereof, or mixtures of these.

It is particularly advantageous to use, as tetraalkoxysilane, tetraethoxysilane and/or oligomers of tetraethoxysilane.

When using alkoxysilane(s), preferably tetraalkoxysilane(s), the great advantage is that no salts are produced. This is advantageous both environmentally and in regard of possible agglomeration processes during the sol-gel reaction, since salts disrupt the electrostatic stabilization of the pigment particles.

Usually the sol-gel reaction is catalyzed by an amine like ammonia or an organic amine. The amine may be a primary, a secondary or a tertiary amine In preferred embodiments the amine comprises 1 to 8 C-atom, more preferably 1 to 6 and particularly preferred 1 to 5 C-atoms.

Amines with more than 8 C-atoms may be too demanding sterically to be employed as effective catalysts.

According to preferred embodiments of this invention the amine is chosen from dimethylethanolamine (DMEA), monoethanolamine, diethanolamine, triethanolamine, ethylendiamine (EDA), t-butylamine, monomethylamine, dimethylamine, trimethylamine, monoethylamine, diethylamine, triethylamine, pyridine or derivate thereof, aniline or derivate thereof, choline or derivate thereof, urea or derivate thereof, hydrazine or derivates thereof or mixtures thereof.

According to most preferred embodiments of this invention the amine is chosen from ethylendiamine, monoethylamine, diethylamine, monomethylamine, dimethylamine, trimethylamine, triethylamine or mixtures thereof.

Organic solvents used are preferably alcohols, glycols, esters, ketones, and mixtures of these solvents. Particularly preferred is the use of alcohols or glycols or mixtures thereof, and especially preferred is the use of alcohols.

As the alcohol it is advantageous to use methanol, ethanol, isopropanol, n-propanol, tert-butanol, nbutanol, isobutyl alcohol, pentanol, hexanol or mixtures thereof.

Particular preference is given to using ethanol and/or isopropanol.

As glycol, it is advantageous to use butylglycol, propylglycol, ethylene glycol or mixtures thereof.

The reaction mixture present is reacted preferably at a temperature within a range from 20° C. up to the boiling point of the respective solvent or solvent mixture. With particular preference the reaction temperature is within a range from 50° C. up to a temperature which is preferably 5° C. below the boiling point of the respective solvent or solvent mixture. A preferred reaction temperature range is the temperature range extending from 70° C. to 82° C.

The reaction time is situated preferably within a range of 2 to 20 h, more preferably 3 to 8 hours.

The silicon oxide coating (a), preferably the silicon dioxide layer, can be applied under conditions as disclosed in DE 10 2010 007 147 A1.

A coating (a) made up of a hybrid coating of silicon oxide, preferably silicon dioxide, and at least one organic oligomer and/or at least one organic polymer can be applied under conditions as disclosed in in EP 1812519 B1 or in WO 2016/120015 A1.

The organic-chemical modification layer can be applied under conditions as disclosed in DE 10 2013 113 885 A1.

The formation of layer (b) is preferably made by first treating either a molybdenum oxide or a tungsten oxide with hydrogen peroxide in aqueous solution to dissolve the metal oxide. Herein a mixture of several metal compounds including peroxide complexes are produced.

This solution is added to PVD aluminum flakes dispersed in an organic solvent as used for the sol-gel process of forming layer (a). The addition can occur before or after the silicon oxide containing layer (a) had been formed encapsulating the PVD aluminum flakes. The precipitation on the pigment surface can occur in presence of bases or acids as also used for the sol-gel reaction of forming layer (a).

The whole coating process of forming layers (a) and (b) can be made as a one pot synthesis. In other embodiments a two pot synthesis route may be used by first coating layer (a) or (b), than separating the coated PVD aluminum flakes from solvent, dispersing them in an new solvent and coating with the second coating (b) or (a).

Use and Formulations:

The invention is also directed to a use of a plate-like PVD aluminum pigment according to any one of claims 1 to 13 in a formulation, preferably in an aqueous formulation.

The invention is furthermore directed to a formulation wherein said formulation contains a plate-like PVD aluminum pigment according to any one of claims 1 to 13.

The formulation can be selected from the group consisting of coating systems, paints, lacquers, printing inks, powder paints, architectural coating compositions, plastics, security printing inks, ceramics and cosmetic preparations.

Especially preferred is a lacquer used for automotive interior parts. Furthermore water-based paints or lacquers are preferred.

According to a preferred embodiment, the plate-like PVD aluminum pigment, preferably a PVD aluminum pigment, is used in an aqueous formulation, such as aqueous coating system, aqueous paint, aqueous printing ink, aqueous security printing ink or an aqueous cosmetic preparation.

EXAMPLES

The following examples are given only for illustration of the invention. The examples are not to be construed as limiting the scope of the invention. The scope of the invention is defined only by the appended claims.

A Preparations

Experiments were done according to the following recipes. In Table 1 it is indicated which of the examples is based on which recipe. The amounts of molybdenum or of tungsten acid can be depicted from Table 1.

1.1. Preparation of a Peroxomolybdic Acid Solution:

5 g powdered molybdic acid (molybdenum(VI)oxide hydrate, $MoO_3 \cdot H_2O$) were dissolved at room temperature under stirring in 15 g of an aqueous 30% $H_2O_2$-solution until a clear yellow solution evolved.

1.2 Preparation of a Peroxotungsten Acid Solution (According to P. C. Murrau, *Anal. Chem.,* 1961, 33 (8), Pp 1125-1126):

0.5 g metallic tungsten was dissolved at room temperature under stirring in 4.5 g of an aqueous 30% $H_2O_2$-solution until a clear yellow solution evolved.

Example A1 (Invention)

150 g of a commercially available PVD aluminum pigment (Metalure W-52012 IL; Eckart GmbH; containing 30 g aluminum and residues of polyvinyl pyrrolidone vinylacetate used as release coat) were dispersed under stirring in 450 g isopropanol in a chemical reactor.

A defined amount (see table 1) of peroxomolybdenum acid solution prepared according to section 1.1 was added and stirred for 30 min. The dispersion was heated to 70° C. and stirred for further 25 min. Then 18.8 g TEOS (tetraethoxysilane) and 18.8 g water were added and stirred for 1 h. Then 4.5 g of a 25-wt-% solution of ammonia in water was dosed within 1 h to the reaction mixture. After 7 h of reaction period 1.2 g Dynasylan Octeo were added and subsequently 0.4 g Dynasylan AMMO were added. The reaction mixture was stirred for further 120 min. The dispersion was cooled down to room temperature and filtered using a Büchner funel isolating the coated PVD pigment. The pigment was finally combined with isopropanol to yield a pigment dispersion with a pigment content of 10 wt.-%.

Example A2 (Invention)

150 g of a commercially available PVD aluminum pigment (Metalure W-52012 IL; containing 30 g aluminum and residues of release coat) were dispersed under stirring in 365 g isopropanol in a jacketed 1 L glassreactor. The dispersion was heated to 70° C. and stirred for further 25 min. Then 18.8 g TEOS and 18.8 g water were added and the dispersion was stirred for 1 h. Then 4.5 g of a 25-wt-% solution of ammonia in water was dosed within 1 h to the reaction mixture. After 7 h of reaction period a defined amount (see table 1, column 5) of peroxomolybdenum acid solution prepared according to Section 1.1 was added and stirred for 30 min. Then 1.2 g Dynasylan Octeo and subsequently 0.4 g Dynasylan AMMO were added. The reaction mixture was stirred for further 120 min. The dispersion was cooled down to room temperature and filtered using a Büchner funel isolating the coated PVD pigment. The pigment was finally combined with isopropanol to yield a pigment dispersion with a pigment content of 10 wt.-%.

Example A3 (Invention)

Like Example A1 except that peroxotungsten acid solution prepared according to Section 1.2 was used instead of the peroxomolybdenum acid solution. Amounts are defined in table 1.

Example A4 (Invention)

Like Example A2 except that peroxotungsten acid solution prepared according to Section 1.2 was used instead of the peroxomolybdenum acid solution. Amounts are defined in table 1.

Comparative Example 2 (without Treatment of Peroxomolybdenum or Peroxotungsten Acid Solution)

150 g of a commercially available PVD aluminum pigment (Metalure W-52012 IL; containing 30 g aluminum and residues of release coat) was dispersed under stirring in 365 g isopropanol. The dispersion was heated to 70° C. and stirred for further 45 min. Then 18.8 g TEOS and 18.8 g water were added and stirred for 1 h. Then 4.5 g of a 25-wt-% solution of ammonia in water was dosed within 1 h to the reaction mixture. After 5 h of reaction period 1.2 g Dynasylan Octeo and subsequently 0.4 g Dynasylan AMMO were added. The reaction mixture was stirred for further 120 min. The dispersion was cooled down to room temperature and filtered using a Büchner funel isolating the coated PVD pigment. The pigment was finally combined with isopropanol to yield a pigment dispersion with a pigment content of 10 wt.-%.

Example B1 (Invention)

300 g of a commercially available PVD aluminum pigment dispersion (Metalure A-41010 BG; Eckart GmbH; containing 30 g aluminum and residues of polyacrylate used as release coat) were dispersed under stirring in 300 g isopropanol.

A defined amount (see table 1) of peroxomolybdenum acid solution prepared according to Section 1.1 was added and stirred for 30 min. The dispersion was heated to 70° C. and stirred for further 45 min. 21.4 g TEOS and 21.4 g water were added and stirred for further 1 h. Then 6 g of a 25-wt-% solution of ammonia in water was dosed within 1 h to the reaction mixture. After 7 h of reaction period 5 g Hydrosil 2909 were added. The reaction mixture was stirred for further 2 h and then was cooled down to room temperature and filtered using a Buchner funel isolating the coated PVD pigment. The pigment was finally combined with isopropanol to yield a pigment dispersion with a pigment content of 10 wt.-%.

Example B2 (Invention)

300 g of a commercially available PVD aluminum pigment dispersion (Metalure A-41010 BG; containing 30 g aluminum and residues of polyacrylate used as release coat) were dispersed under stirring in 300 g isopropanol.

21.4 g TEOS and 21.4 g water were added and stirred for further 1 h. Then 4.5 g of a 25-wt-% solution of ammonia in water were dosed within 1 h to the reaction mixture. After 5 h of reaction period a defined amount (see table 1, column 5) of peroxomolybdenum acid solution prepared according to 1.1 was added and stirred for 30 min. Then 5 g Hydrosil 2776 were added. The reaction mixture was stirred for further 2 h and then was cooled down to room temperature and filtered using a Büchner funel isolating the coated PVD pigment. The pigment was finally combined with isopropanol to yield a pigment dispersion with a pigment content of 10 wt.-%.

Example B3 (Invention)

Like Example B1 except that peroxotungsten acid solution prepared according to Section 1.2 was used instead of the peroxomolybdenum acid solution. Amounts are defined in table 1.

Example B4 (Invention)

Like Example B2 except that peroxotungsten acid solution prepared according to Section 1.2 was used instead of the peroxomolybdenum acid solution. Amounts are defined in table 1.

Comparative Example 1 (without Treatment of Peroxomolybdenum of Peroxotungsten Acid Solution)

300 g of a commercially available PVD aluminum pigment dispersion (Metalure A-41010 BG; containing 30 g aluminum and residues of polyacrylate used as release coat) were dispersed under stirring in 300 g isopropanol.

21.4 g TEOS and 21.4 g water were added and stirred for further 1 h. Then 5 g of a 25-wt-% solution of ammonia in water was dosed within 1 h to the reaction mixture. After 5 h of reaction period 5 g Hydrosil 2776 were added. The reaction mixture was stirred for further 1 h and then was cooled down to room temperature and filtered using a Büchner funel isolating the coated PVD pigment. The pigment was finally combined with isopropanol to yield a pigment dispersion with a pigment content of 10 wt.-%.

B Test Methods

The samples were tested with respect to their hydrolysis stabilities according to the following method according to Volkswagen test TL 226, § 3.12.1 for coatings in automotive interior: 10 g of the dispersions of the coated PVD pigments were dispersed in 2.5 g butylglycol with the aid of 0.5 g of a dispersing additive. 70 g of an aqueous acrylate binder system were added and the pH was adjusted to a range of 7.6 to 8.0. The basecoat should have a viscosity of in a range of 80 to 120 mPas measured at a shear rate of 1000 1/s with a Brookfield viscosimeter. If necessary the viscosity can be adjusted by further addition of water. A plastic substrate (ABS/PC Blend) was coated with this basecoat using a Langguth (Erichsen GmbH, model 480) under the following spraying conditions:

pistol conditions: 1.1.0/4 runs drying time: 10 min room temperature and 15 min at 80° C.

The thickness of this base coat was about 2 to 4 μm. A clearcoat was sprayed on top of this base coat with pistol parameter 2.1.2 in two runs and dried for 30 min at 80° C.

The coated substrates were stored for 48 hours at 80° C.

Then the coated substrates were subjected at 90° C. and a humidity of >96% for 72 hours in a desiccator. The treated substrates were dried and the L*a*b* coordinates were measured at i=5 angles of 15°, 25°, 45°, 75° and 110° (cis-configuration) in comparison to untreated substrates (Byk-Mac, Byk Instruments, Geretsried, Germany). A ΔE* was obtained for these angles and averaged according to the following formula:

$$\Delta E^* = \frac{\sqrt{\sum_i^{110°}\left(\Delta E_i^2 + \Delta a_i^2 + \Delta b_i^2\right)}}{5} \tag{II}$$

wherein i are the angles of measurement and the $\Delta E_i$, $\Delta a_i$ and $\Delta b_i$ are the differences of the coordinates between treated and not treated substrates at the specific angle i.

The test was well passed with a ΔE* of below 2.0. At a ΔE* in a range of 2 to 5 the test was passed. A ΔE* in a range of over 5 to 15 means a partial passing in the sense that the pigments may be incorporated into certain 2-coat system coatings in an application which exhibit a not too high criticality.

If ΔE* is above 15 the test is not passed.

Method of Determining the Content of Mo or W:

200 mg of the coated pigments were dissolved in a mixture of 10 ml of nitric acid (65%) diluted with about 10 ml water and 2 ml hydrofluoric acid (40%) which was heated below their boiling points. The concentration of molybdenum or tungsten was measured with optical emission spectroscopy (ICP-OES). Every sample was prepared twice and five single measurements were made and averaged. All preparations and measurements were made using housing materials compatible with hydrofluoric acid.

Furthermore the concentration of elemental silicon was measured using an internal scandium standard. The concentration was calculated as $SiO_2$.

TABLE 1

Summary of experimental parameters of Examples and Comparative Examples and Hydrolysis test results

| Example | Underlying receipe | Metal of metal oxide and order of addition | Basis-PVD pigment Metalure | Mo- or W-compound wt -% ratio to Al in solution | $SiO_2$/ wt.-% to Al | Mo or W content/wt-% (based on dryed powder of total pigment) | Hydrolysis test/ΔE* | Hydrolysis test note |
|---|---|---|---|---|---|---|---|---|
| Comparative example 1: | | — | A-41010 BG | — | | — | 24.4 | not passed |
| Example 1 | B1 | Mo before SiO2 | A-41010 BG | 0.250 | 15.3 | 0.01 | 2.7 | passed |

TABLE 1-continued

Summary of experimental parameters of Examples and Comparative Examples and Hydrolysis test results

| Example | Underlying receipe | Metal of metal oxide and order of addition | Basis-PVD pigment Metalure | Mo- or W-compound wt -% ratio to Al in solution | $SiO_2$/ wt.-% to Al | Mo or W content/wt-% (based on dryed powder of total pigment) | Hydrolysis test/ΔE* | Hydrolysis test note |
|---|---|---|---|---|---|---|---|---|
| Example 2 | B1 | Mo before SiO2 | A-41010 BG | 0.025 | 16.2 | <0.01 | 4.9 | passed |
| Example 3 | B1 | Mo before SiO2 | A-41010 BG | 0.125 | 17.2 | 0.01 | 1.9 | well passed |
| Example 4 | B1 | Mo before SiO2 | A-41010 BG | 0.500 | 17.0 | 0.28 | 2.5 | passed |
| Example 5 | B1 | Mo before SiO2 | A-41010 BG | 1.250 | 16.3 | | 2.6 | passed |
| Example 6 | B1 | Mo before SiO2 | A-41010 BG | 2.500 | 16.4 | 0.27 | 2.4 | passed |
| Example 7 | B2 | Mo after SiO2 | A-41010 BG | 0.250 | 17.5 | | 2.8 | passed |
| Comparative example 2: | A | — | W-52012 IL | 0 | | — | 25.9 | not passed |
| Example 8 | A1 | Mo before SiO2 | W-52012 IL | 0.25 | | | 0.8 | well passed |
| Example 9 | A2 | Mo after SiO2 | W-52012 IL | 0.25 | | | 1.2 | well passed |
| Example 10 | A3 | W before SiO2 | W-52012 IL | 1.125 | 15 | 0.05 | 0.6 | well passed |
| Example 11 | A3 | W before SiO2 | W-52012 IL | 2.25 | | 0.07 | 0.9 | well passed |
| Example 12 | A3 | W before SiO2 | W-52012 IL | 0.75 | | 0.04 | 0.7 | well passed |
| Example 13 | A3 | W before SiO2 | W-52012 IL | 1.5 | | 0.05 | 0.4 | well passed |
| Example 14 | A4 | W after SiO2 | W-52012 IL | 0.75 | | <0.01 | 2.1 | passed |
| Example 15 | A4 | W after SiO2 | W-52012 IL | 1.5 | | 0.05 | 1.1 | well passed |
| Example 16 | B3 | W before SiO2 | A-41010 BG | 0.25 | 16.3 | <0.01 | 14.8 | partially passed |
| Example 17 | B3 | W before SiO2 | A-41010 BG | 0.5 | 16.3 | <0.01 | 4.9 | passed |
| Example 18 | B4 | W after SiO2 | A-41010 BG | 0.25 | 16.5 | <0.01 | 14.9 | partially passed |
| Example 19 | B4 | W after SiO2 | A-41010 BG | 0.5 | 16.2 | 0.01 | 7.5 | partially passed |

CONCLUSIONS

All the inventive Examples exhibited a significantly increased stability in the hydrolysis test compared to the respective Comparative Examples 1 and 2 which did not pass the test. Generally the Mo-oxide/$SiO_2$ coated systems had a high stability (Examples 1 to 9). The order of the metal oxide coating didn't seem to have a significant effect.

The W-oxide/$SiO_2$ coatings exhibited a very good stability for the W-52012 PVD-Al-pigment which had a thickness $h_{50}$ determined by SEM of about 40 nm (Examples 10 to 13). The W-oxide/$SiO_2$ coating is slightly better than the $SiO_2$/W-oxide coating. For the thinner PVD-Al-pigments (A-41010; thickness $h_{50}$ determined by SEM about 32 nm) exhibiting a higher specific surface more tungsten material must be chosen to obtain an acceptable stability. At a lower amount the test is just partially passed. The hydrolysis test results for those Examples having a coating with a first layer of W-oxide followed by a silica coating were slightly better that for those Examples having the reversed order of coatings.

The invention claimed is:

1. An encapsulated pigment comprising a plate-like PVD aluminum pigment and a protective encapsulation disposed on the PVD aluminum pigment, wherein the protective encapsulation consists of the following layers:

a continuous encapsulating silicon oxide containing coating consisting of a mixture of silicon oxide and an organofunctional silane having formula (I) acting as a network modifier $$R_{(4-z)}Si(X)_z \quad (I)$$

wherein, z is an integer from 1 to 3, R comprises one or more of an unsubstituted, unbranched or branched alkyl chain having 1 to 24 C atoms, an aryl group having 6 to 18 C atoms, and an arylalkyl group having 7 to 25 C atoms, and X comprises one or more of a halogen group and an alkoxy group, and the silicon oxide containing coating amounts to 8 wt.-% to 25 wt.-%, based on the weight of the uncoated PVD aluminum pigment, a layer of metal oxide, wherein the metal oxide includes one or more of molybdenum oxide, molybdenum hydroxide, molybdenum oxide hydrate, tungsten oxide, tungsten hydroxide, and tungsten oxide hydrate, and the metal oxide includes 0.01 to 0.4 wt.-% molybdenum or 0.01 to 0.8 wt.-% tungsten, calculated as elemental molybdenum or elemental tungsten and based on the weight of the uncoated PVD aluminum pigment, optionally an outer organic-chemical modification layer comprising at least one organofunctional silane; and wherein the silicon oxide containing coating consists of a hybrid coating consisting of a mixture of silicon oxide and said organofunctional silane having formula (I) acting as a network modifier distributed throughout the hybrid coating.

2. The encapsulated pigment according to claim 1, wherein the PVD aluminum pigment has a median diameter $d_{50}$ in the range of 2 to 30 μm.

3. The encapsulated pigment according to claim 1, wherein the PVD aluminum pigment has a median thickness $h_{50}$ in the range of 15 to 75 nm.

4. The encapsulated pigment according to claim 1, wherein the silicon oxide containing coating has an average thickness in a range of 15 to 60 nm.

5. The encapsulated pigment according to claim 1, wherein the metal oxide includes 0.01 to 0.8 wt.-% tungsten, calculated as elemental tungsten and based on the weight of the uncoated PVD aluminum pigment.

6. The encapsulated pigment according to claim 1, including an outer organic-chemical modification layer comprising at least one organofunctional silane.

7. An encapsulated pigment according to claim 1, wherein said silane consists of phenyltrimethoxysilane, phenyltriethoxysilane, diphenyldimethoxysilane, or diphenyldiethoxysilane.

8. An encapsulated pigment comprising a plate-like PVD aluminum pigment and a protective encapsulation disposed on the PVD aluminum pigment, wherein the protective encapsulation comprises:

a continuous encapsulating silicon oxide containing coating consisting of a mixture of silicon oxide and an organofunctional silane having formula (I) acting as a network modifier $$R_{(4-z)}Si(X)_z \quad (I)$$

wherein, z is an integer from 1 to 3, R comprises one or more of an unsubstituted, unbranched or branched alkyl chain having 1 to 24 C atoms, an aryl group having 6 to 18 C atoms, and an arylalkyl group having 7 to 25 C atoms, and X comprises one or more of a halogen group and an alkoxy group, and the silicon oxide containing coating amounts to 8 wt.-% to 25 wt.-%, based on the weight of the uncoated PVD aluminum pigment, a layer of metal oxide, wherein the metal oxide includes one or more of molybdenum oxide, molybdenum hydroxide, molybdenum oxide hydrate, tungsten oxide, tungsten hydroxide, and tungsten oxide hydrate, and the metal oxide includes 0.01 to 0.4 wt.-% molybdenum or 0.01 to 0.8 wt.-% tungsten, calculated as elemental molybdenum or elemental tungsten and based on the weight of the uncoated PVD aluminum pigment, the layer of metal oxide being directly applied to the PVD pigment; and wherein the silicon oxide coating consists of a hybrid coating consisting of a mixture of silicon oxide and a silane, the silane consisting of phenyltrimethoxysilane, phenyltriethoxysilane, diphenyldimethoxysilane, or diphenyldiethoxysilane, the silane acting as a network modifier distributed throughout the hybrid coating.

9. The encapsulated pigment according to claim 8, wherein the silicon oxide containing coating has an average thickness in a range of 15 to 60 nm.

10. The encapsulated pigment according to claim 8, wherein the metal oxide includes 0.01 to 0.8 wt.-% tungsten, calculated as elemental tungsten and based on the weight of the uncoated PVD aluminum pigment.

11. The encapsulated pigment according to claim 8, wherein the protective encapsulation consists of two layers, one layer being said continuous encapsulating silicon oxide containing coating and the other layer being said metal oxide layer.

12. An encapsulated pigment comprising a plate-like PVD aluminum pigment and a protective encapsulation disposed on the PVD aluminum pigment, wherein the protective encapsulation comprises the following layers:

a continuous encapsulating silicon oxide containing coating, wherein the coating is a hybrid coating consisting of a mixture of silicon oxide and an organofunctional silane having formula (I) acting as a network modifier distributed throughout the hybrid coating $$R_{(4-z)}Si(X)_z \quad (I)$$

wherein, z is an integer from 1 to 3, R comprises one or more of an unsubstituted, unbranched or branched alkyl chain having 1 to 24 C atoms, an aryl group having 6 to 18 C atoms, and an arylalkyl group having 7 to 25 C atoms, and X comprises one or more of a halogen group and an alkoxy group, and the silicon oxide containing coating amounts to 8 wt.-% to 25 wt.-%, based on the weight of the uncoated PVD aluminum pigment, a layer of metal oxide, wherein the metal oxide includes one or more of molybdenum oxide, molybdenum hydroxide, molybdenum oxide hydrate, tungsten oxide, tungsten hydroxide, and tungsten oxide hydrate, and the metal oxide includes 0.01 to 0.4 wt.-% molybdenum or 0.01 to 0.8 wt.-% tungsten, calculated as elemental molybdenum or elemental tungsten and based on the weight of the uncoated PVD aluminum pigment, and optionally an outer organic-chemical modification layer comprising at least one organofunctional silane.

13. An encapsulated pigment according to claim 7, wherein the silicon oxide coating consists of a hybrid coating consisting of a mixture of silicon oxide and a silane, the silane consisting of phenyltrimethoxysilane, phenyltriethoxysilane, diphenyldimethoxysilane, or diphenyldiethoxysilane, the silane acting as a network modifier distributed throughout the hybrid coating.

14. An encapsulated pigment according to claim 7, wherein the protective encapsulation consists of the following layers:

a continuous encapsulating silicon oxide containing coating, wherein the coating is a hybrid coating consisting of a mixture of silicon oxide and an organofunctional silane having formula (I) acting as a network modifier distributed throughout the hybrid coating $$R_{(4-z)}Si(X)_z \quad (I)$$

wherein, z is an integer from 1 to 3, R comprises one or more of an unsubstituted, unbranched or branched alkyl chain having 1 to 24 C atoms, an aryl group having 6 to 18 C atoms, and an arylalkyl group having 7 to 25 C atoms, and X comprises one or more of a halogen group and an alkoxy group, and the silicon oxide containing coating amounts to 8 wt.-% to 25 wt.-%, based on the weight of the uncoated PVD aluminum pigment, a layer of metal oxide, wherein the metal oxide includes one or more of molybdenum oxide, molybdenum hydroxide, molybdenum oxide hydrate, tungsten oxide, tungsten hydroxide, and tungsten oxide hydrate, and the metal oxide includes 0.01 to 0.4 wt.-% molybdenum or 0.01 to 0.8 wt.-% tungsten, calculated as elemental molybdenum or elemental tungsten and based on the weight of the uncoated PVD aluminum pigment, and optionally an outer organic-chemical modification layer comprising at least one organofunctional silane.

* * * * *